(No Model.)
J. WELLSTEIN & M. E. MAXFIELD.
PNEUMATIC TIRE.
No. 481,681. Patented Aug. 30, 1892.
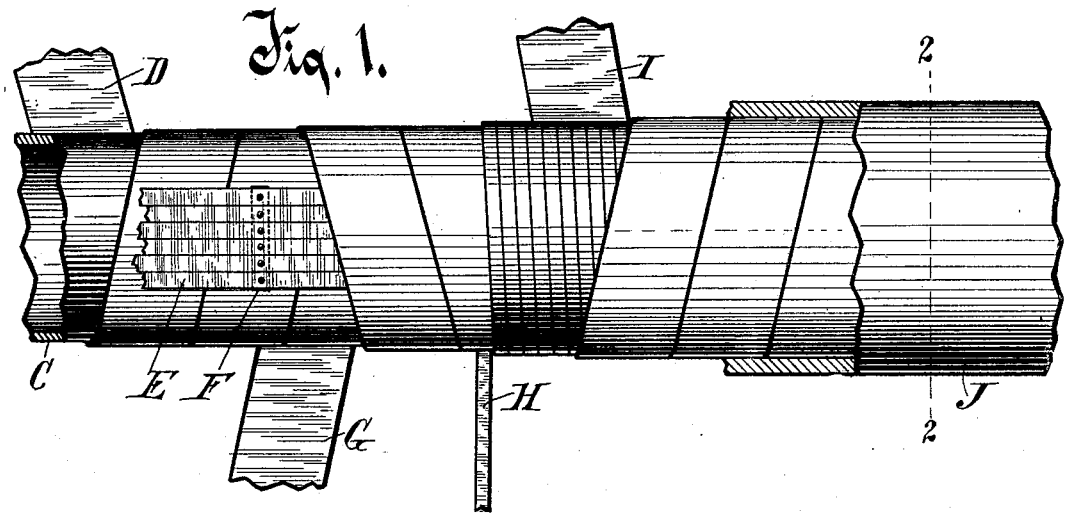
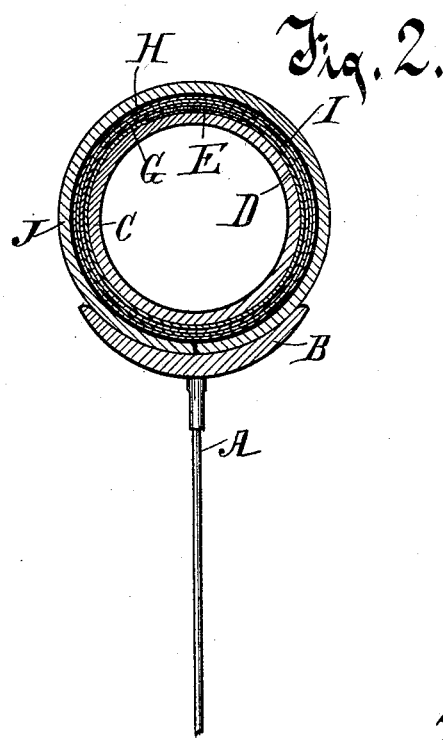
Witnesses.
A. H. Keeney,
Anna V. Faust.
Inventors.
Joseph Wellstein and
Morgan E. Maxfield,
by Benedict & Morsell
Attorneys.

UNITED STATES PATENT OFFICE.

JOSEPH WELLSTEIN AND MORGAN E. MAXFIELD, OF MILWAUKEE, WISCONSIN.

PNEUMATIC TIRE.

SPECIFICATION forming part of Letters Patent No. 481,681, dated August 30, 1892.

Application filed April 11, 1892. Serial No. 428,574. (No model.)

*To all whom it may concern:*

Be it known that we, JOSEPH WELLSTEIN and MORGAN E. MAXFIELD, of Milwaukee, in the county of Milwaukee and State of Wisconsin, have invented a new and useful Improvement in Pneumatic Tires for Bicycles, of which the following is a description, reference being had to the accompanying drawings, which are a part of this specification.

Our invention has relation to pneumatic tires for bicycles. In devices of this character it is of course a desideratum to combine lightness, simplicity, cheapness, durability, and resiliency.

It is the object, therefore, of our invention, besides other desirable qualities, to include the above-named features; and with this end in view it consists in the improved construction and combination of parts, as hereinafter more fully set forth.

In the accompanying drawings, Figure 1 is a plan view of our improved tire, showing portions thereof broken away and disclosing clearly the several constituent parts; and Fig. 2 is a cross-sectional view of the tire when applied to the rim of a wheel on a plane indicated by the line 2 2 of Fig. 1.

Like letters of reference indicate like parts throughout the several views.

Referring to the drawings, the letter A indicates one of the spokes of a bicycle-wheel, and B the rim or periphery thereof.

The inner air-tube, which is arranged around rim B, is indicated by the letter C. This tube is wrapped with a strip of tire-tape D, said tape being saturated with rubber and wound tightly around the air-tube, thereby having a tendency to prevent the tube from stretching under all conditions, and especially when the air is introduced therein.

Exteriorly of tape D is arranged circumferentially along the surface which contacts with the ground as the wheel is revolved a series of steel strips E, preferably of spring-steel, six of said strips being shown in the drawings. They are secured together by means of transverse pieces F, which are riveted thereto. In practice we find that four of these transverse securing-pieces, arranged equidistant apart around the tire, are sufficient for the purpose. A second vulcanized tire tape or binding G is wrapped about the tube, and besides serving as a reinforcement and preventing the air-tube from undue expansion, also retains the steel strips E in proper position. The next layer of the series is a flat spring H, which is coiled around so that a continuous metallic surface is presented, the opposite ends of the spring being secured in any desirable manner. Next to this is wound a rubber-coated tape or binding I, serving to maintain the spring in proper position, as well as to assist in reinforcing the tire. It will be noticed that the several tapes D, G, and I are alternately wound in opposite directions. Surrounding the air-tube, and the several parts above described which emcompass the same, is an outer tube J of vulcanized rubber.

From the above description it will be apparent that our tire is practically indestructible. In case, however, the inflated tube should possibly become accidentally punctured, its inherent stiffness is sufficient to make it a practical and serviceable cushion until repaired. The flat spring H presents a continuous metallic surface, and would therefore render it extremely difficult for a stone or sharp projection to pass the same and puncture the inner air-tube. Should such a projection by any possibility, however, pass between the meeting edges of this spring it would next encounter the steel strips E, thereby reducing the chances of puncture to the minimum, as these last-named strips are introduced between the inner and outer tubes at a point where the tire comes in contact with the ground or where it is most liable to be punctured. It will be further noted these strips do not interfere in the least with the resiliency of the tire.

Having thus described our invention, what we claim, and desire to secure by Letters Patent of the United States, is—

1. A pnematic tire consisting of an inner air-tube, a flat spring wound thereabout with its edges contacting to form a continuous or non-open elastic metallic covering, a reinforcing wrapping maintaining said spring in position, and an outer inclosing tube, substantially as set forth.

2. A pneumatic tire consisting of an inner air-tube, a rubber-coated binding wound thereabout, a flexible band of spring metal surrounding the central tread-line of the tube, a flat spring wound continuously about the tube, a rubber-coated binding interposed between the strips and the spring, a similar binding wound about said spring, and an outer inclosing tube, substantially as set forth.

In testimony whereof we affix our signatures in presence of two witnesses.

JOSEPH WELLSTEIN.
MORGAN E. MAXFIELD.

Witnesses:
C. T. BENEDICT,
ARTHUR L. MORSELL.